United States Patent
Ferrell, Jr. et al.

(10) Patent No.: US 9,127,195 B1
(45) Date of Patent: Sep. 8, 2015

(54) METHOD OF MAKING A VISCOUS AQUEOUS LIQUID

(71) Applicants: James C. Ferrell, Jr., Rockwall, TX (US); James J. Lavene, Rockwall, TX (US); Trinidad Munoz, Jr., Dallas, TX (US)

(72) Inventors: James C. Ferrell, Jr., Rockwall, TX (US); James J. Lavene, Rockwall, TX (US); Trinidad Munoz, Jr., Dallas, TX (US)

(73) Assignee: Fritz Industries, Inc., Mesquite, TX (US)

( * ) Notice: Subject to any disclaimer, the term of this patent is extended or adjusted under 35 U.S.C. 154(b) by 303 days.

(21) Appl. No.: 13/507,809

(22) Filed: Oct. 9, 2012

Related U.S. Application Data (63) Continuation-in-part of application No. 12/661,722, filed on Mar. 23, 2010, now abandoned.

(51) Int. Cl.

| | |
|---|---|
| *C09K 8/68* | (2006.01) |
| *C09K 8/60* | (2006.01) |
| *C09K 8/72* | (2006.01) |
| *C09K 8/10* | (2006.01) |
| *B01F 17/00* | (2006.01) |
| *E21B 43/26* | (2006.01) |
| *C09K 8/80* | (2006.01) |

(52) U.S. Cl.
CPC ...................................... *C09K 8/805* (2013.01)

(58) Field of Classification Search
CPC ............ C09K 8/66; C09K 8/665; C09K 8/62; C09K 8/80; C09K 8/805; C09K 2208/04; Y10S 507/924; Y10S 507/901; Y10S 507/902
USPC ......... 507/204, 901, 209, 213, 214, 215, 216, 507/217, 229; 166/308.1
See application file for complete search history.

(56) References Cited

U.S. PATENT DOCUMENTS

| | | | |
|---|---|---|---|
| 4,021,355 A | 5/1977 | Holtmyer et al. | 252/8.55 R |
| 4,191,249 A | 3/1980 | Sarem | 166/244 |
| 4,202,795 A | 5/1980 | Burnham et al. | 252/332 |
| 5,253,711 A | 10/1993 | Mondshine | 166/300 |
| 5,305,832 A * | 4/1994 | Gupta et al. | 166/300 |
| 5,422,183 A | 6/1995 | Sinclair et al. | 428/403 |
| 5,547,026 A | 8/1996 | Brannon et al. | 166/295 |
| 5,699,860 A | 12/1997 | Grundmann | 166/280 |
| 7,290,614 B2 | 11/2007 | Smith et al. | 166/300 |
| 7,584,791 B2 | 9/2009 | Robb et al. | 166/279 |
| 2005/0194135 A1 | 9/2005 | Nguyen et al. | 166/272.1 |
| 2005/0194141 A1 | 9/2005 | Sinclair et al. | 166/280.2 |
| 2005/0288190 A1 | 12/2005 | Dao et al. | 507/209 |
| 2008/0078547 A1 | 4/2008 | Sinclair et al. | 166/278 |
| 2010/0307749 A1 * | 12/2010 | Nguyen et al. | 166/278 |

OTHER PUBLICATIONS

Scale Removal and Control, Halliburton Services, Sep. 28, 1993, 4.
Technical Data Sheet SCP-2, Halliburton Co, Oct. 1960, 3.
Technical Data Sheet SCP-2, Halliburton Services.
SinterBall Bauxite MSDS, Mineracao Curimbaba Ltda, Sep. 28, 1998, 4.
Sand MSDS, Fritz Industries, Inc, Nov. 4, 2008, 2.
LiteProp 125 MSDS, Fritz Industries, Inc, Jul. 17, 2008, 2.
Crosslinker XE 137 MSDS, Schlumberger, May 25, 2007, 7.
FBP-34 Welan Gum MSDS, Fritz Industries, Inc, Jul. 6, 2006, 2.
Beijing Ranger Chem SM-828 liquid Epoxy Resin, Beijing Ranger Chemical Co, Dec. 1, 2009, 1.
PVP-K-30 MSDS polyvinylpyrrolidone, GAF Chemicals Corporation, Jul. 1990, 6.

* cited by examiner

*Primary Examiner* — Aiqun Li
(74) *Attorney, Agent, or Firm* — Thomas R. Weaver (57) ABSTRACT

A quantity of insoluble solid particles is coated with a hydratable gelling agent to produce a composition comprised of a mass of discrete solid particles which is dry and flowable. The composition is made by placing a binder on the insoluble solid particles and then, while the binder is sticky, placing a hydratable gelling agent on the sticky binder to thereby form the composition. The hydratable gelling agent on the composition, upon contact with an aqueous liquid, operates to increase the viscosity of the aqueous liquid.

11 Claims, 1 Drawing Sheet

METHOD OF MAKING A VISCOUS AQUEOUS LIQUID

This is a continuation-in-part of U.S. patent application Ser. No. 12/661,722, filed on Mar. 23, 2010.

BACKGROUND OF THE INVENTION

1. Technical Field of the Invention

This invention relates to compositions for and methods of treating subsurface formations. The invention also relates to methods of treating subsurface formations to stimulate the recovery of petroleum hydrocarbons therefrom. The invention further relates to insoluble solid particles coated with materials which are useful in methods of stimulating the recovery of petroleum hydrocarbons from subsurface formations. The invention still further relates to a method of making a viscous liquid having insoluble solid particles suspended therein.

2. Description of the Prior Art and Problems Solved

Petroleum hydrocarbons occur in the pore spaces of identified subterranean formations. Hydrocarbons are recovered from the pore spaces through a borehole drilled from the surface of the earth which penetrates the identified formation. Petroleum flows from the pore spaces through the formation to the borehole and then to the surface. For a variety of reasons the rate of flow of hydrocarbons through a formation can be unsatisfactorily low.

The art has developed a number of processes for increasing the rate of flow. Such processes are sometimes referred to as formation stimulation. One such stimulation process, referred to as hydraulic fracturing, features the use of an aqueous liquid to form a crack, that is, a fracture, in the formation through which formation fluids can flow toward the borehole. The aqueous liquid is referred to as a fracturing fluid.

In the performance of a hydraulic fracturing service, the pressure of the fracturing fluid is intentionally increased within the borehole at the intersection of the borehole and the identified formation, i.e., the formation face. At some time during the increase of the pressure at the formation face the pressure becomes sufficiently high to overcome the mechanical ability of the formation to resist the applied pressure. At that point a fracture opens in the formation and the fracturing fluid flows into the fracture causing it to increase in width and extend into the formation. So long as sufficient pressure is maintained on the fracturing fluid it will operate to prevent the fracture from closing.

Since the purpose of hydraulic fracturing is to increase the rate of flow of hydrocarbons from the formation within the formed fracture toward the borehole, it is necessary to remove the fracturing fluid from the fracture to enable the desired flow. This is accomplished by reducing the applied pressure within the fracture. However, a reduction in applied pressure will not result in a sufficient rate of flow if the fracture closes when the applied pressure is reduced. The art has solved the closure problem by the step of placing a quantity of insoluble solid particles, referred to in the art as proppants, into the formed fracture. In operation, proppants are transported by the fracturing fluid to and placed in the formed fracture. The proppants form a porous pack in the fracture. Upon reduction of hydraulic pressure, proppants in the fracture resist the resulting closing force of the formation to thereby mechanically hold, i.e., prop, the fracture open.

The fracturing fluid suspends the proppants in the fluid while they are being transported to the formation. The suspension is the result of a combination of proppant density, fracturing fluid velocity and fracturing fluid viscosity. In this regard, it is ideally desired that the viscosity of the fluid be low in order to minimize surface pumping pressure while pressure at the formation face is being increased. In contrast, at the moment when the fracture occurs, i.e., breakdown, it is ideally preferred that the viscosity of the fluid rapidly increase to a maximum value as the fracture widens and lengthens, and that the viscosity remain at the maximum value to enable suspension of the proppant in the fracture while applied pressure declines and the fracture closes on the proppant pack.

With applied pressure reduced, accompanied by closure of the fracture on the proppants, it is highly desired, if not necessary, to reduce the viscosity of the fracturing fluid to facilitate flow of the fluid from the fracture to thereby enable the hydrocarbons in the formation to flow in the fracture to the borehole. Such viscosity reduction can be accomplished by the action of a chemical agent on the fluid. The chemical agent is referred to as a breaker.

The art has developed, and continues to develop, compositions and methods of using the compositions in the performance of hydraulic fracturing operations. To this end, a fracturing fluid employed in a hydraulic fracturing service can be a fluid comprised of an aqueous liquid, such as water, to which there is added a material which operates to increase the viscosity of the water, a proppant and a breaker.

It is known that addition of a hydratable organic polymeric material to an aqueous liquid can produce an aqueous product having a viscosity which is greater than the viscosity of the aqueous liquid. The produced aqueous product is at least a liquid colloidal dispersion of the polymeric material in the aqueous liquid, and it can be an aqueous solution of the polymeric material. A liquid colloidal dispersion is referred to as a sol. The hydratable organic polymeric material is sometimes referred to as viscosifying agent or as a viscosifier.

The formation of a sol upon addition of the viscosifier to the aqueous liquid is accompanied by an increase in the viscosity of the aqueous liquid. It is also known to increase the viscosity of the sol by adding a reactant to the sol. It is believed that the reactant causes the dispersed colloidal particles in the sol to form connections to thereby produce a product referred to as a gel. The reactant is conventionally referred to as a cross-linking agent, or, more simply, as a cross linker. In that branch of the petroleum producing arts involving hydraulic fracturing, a "sol" is conventionally referred to as a "gel," the viscosifier is conventionally referred to as a "gelling agent," and the product produced by addition of the cross linker to the "sol" is conventionally referred to as a "cross-linked gel."

The desired result of a successful formation fracturing service is the flow of fluid from the formation. This desired result can be frustrated. In this regard, water insoluble scale, for example calcium and barium sulfate, can, over a period of time, be deposited in natural and formed fractures in subsurface formations. Such scale can reduce, and eventually prevent, flow of fluid from the formation. Accordingly, steps can be taken to remove such scale and/or to prevent or, at least, to reduce the rate of scale deposition. One such preventative measure is to include in the proppant containing fluid a material which slowly dissolves in water present in the formation where it operates to inhibit scale deposition. Such a material is known in the art as a scale inhibitor.

Heretofore, a fracturing fluid having proppants suspended therein has been made from separate ingredients at the location of the well head. Accordingly, water, gelling agent, proppant, cross linker, breaker and scale inhibitor have been transported to the well head and there combined to form a fracturing fluid immediately prior to introduction of the fluid into the borehole.

THE INVENTION

1. Summary of the Invention

By this invention, materials transported to a well head to form a hydraulic fracturing fluid can be reduced to a total of two ingredients, specifically, water and a composition comprised of a mass of solid particles whose exterior surfaces are coated with a chemical agent having a useful function in the performance of a fracturing service. The chemical agent is selected from water soluble materials, water dispersible materials and mixtures thereof. The chemical agent having a useful function in the performance of a fracturing service can be selected from a variety of materials including, but not limited to, gelling agents, scale inhibitors and mixtures thereof.

This invention provides a dry and flowable composition, a method of making the composition and a method of using the composition. The composition consists essentially of a mass of discrete solids consisting of insoluble solid particles having a dry coating on the exterior surfaces of the particles. The dry coating includes a chemical agent selected from materials which are soluble, or are at least dispersible, in an aqueous fluid and mixtures thereof. The chemical agent is preferably selected from materials having a useful function in the treatment of a subsurface formation, such as in the performance of a fracturing service. Such useful chemical agents include, but are not limited to, gelling agents, cross linkers, breakers, and scale inhibitors. The dry coating on the insoluble solid particles can include a combination of several of such useful materials as well as other materials.

The composition is made by placing an adhesive, referred to herein as a binder, on the exterior surfaces of the insoluble solid particles. The binder, while it is sticky, is contacted with a designated chemical agent and then the binder and chemical agent are permitted to form a dry coating on the surfaces of the insoluble solid particles. The chemical agent is selected from materials which are soluble, or are at least dispersible, in an aqueous fluid and mixtures thereof. Examples of such soluble and dispersible materials are mentioned above. The composition can be made and stored in a first location, and later transported for use to a second location remote from the first location.

In one embodiment, the composition consists of a mass of insoluble solid particles having a dry coating on the exterior surfaces thereof. The dry coating includes a gelling agent for an aqueous fluid. In another embodiment the dry coating includes a scale inhibitor. In still another embodiment the dry coating is comprised of a combination of several chemical agents including a gelling agent and a scale inhibitor.

The composition has a number of uses. In one such use a material included in the dry coating disperses in an aqueous liquid to increase the viscosity of the aqueous liquid which then operates to suspend the insoluble solid particles in the fluid. In another use the composition is placed in a subsurface formation and a material included in the dry coating thereafter slowly dissolves in aqueous formation fluids to inhibit the formation of scale on the formation.

The invention also provides an improved method of fracturing a subsurface formation. In this aspect, a mass of insoluble solid particles whose exterior surfaces are covered with a dry, hydratable coating is placed in contact with water. Upon such contact the coatings hydrate to thereby increase the viscosity of the water, and the insoluble solid particles become propping agents in the fracturing process.

The composition of this invention, when employed in a process for fracturing a subsurface formation, can be mechanically blended with an aqueous liquid in a suitable container at the well head. Upon contact with the aqueous liquid in the container, the dry hydratable coating on the composition and water in the aqueous liquid interact to form a gel. The gel possesses a viscosity sufficient to suspend the insoluble solid particles in the gel. The suspended particles function as propping agents in the fracturing operation. For convenience, the gel having the proppants suspended therein is referred to as a fracturing fluid.

The fracturing fluid is pumped through a well bore which penetrates the subsurface formation where it contacts the face of the subsurface formation with pressure sufficient to produce a fracture in the formation to thereby permit the fracturing fluid to enter the produced fracture. The pressure in the fracture is thereafter reduced to permit the fracture to close on the proppants suspended in the gel. The viscosity of the gel can then be reduced to aid in and permit recovery of the aqueous fluid from the fracture without removing the proppants from the fracture. The proppants resist the cushing force of the fracture to thereby prevent the fracture from closing.

In another aspect, the proppants can be coated with a material which slowly dissolves in water present in the formation to inhibit deposition of scale in the fracture. In this regard, the dry coating on the proppants can be limited to a scale inhibitor or it can be a combination of a scale inhibitor and a gelling agent.

2. Description of the Invention

The composition of this invention consists essentially of a mass of discrete solids consisting of insoluble solid particles having a dry coating on the surfaces thereof. The dry coating is comprised of a binder and a chemical agent selected from water soluble materials, water dispersible materials and mixtures thereof. The chemical agent, upon contact with water present in an aqueous liquid, absorbs, dissolves in or otherwise combines with the water. Such contact could produce a number of results one of which would be an increase in the viscosity of the water.

The method of making the composition includes the step of employing an adhesive substance, referred to herein as a binder, which will adhere, i.e., stick, to the surfaces of the insoluble solid particles and which will also cause the chemical agent, sometimes referred to herein as the hydratable material, to stick to the binder. The hydratable material, as well as any other ingredient included in the composition, is added during the process of making the composition while the binder is capable of causing the additive to stick to the insoluble solid particles. The binder employed will not interfere with the mentioned absorption, dissolution, or combination reaction, nor with the function of any other additive present in the coating.

The various separate ingredients of the composition are placed in a container equipped or associated with paddles and blades which are adapted to uniformly blend, stir and move a mass of solid particles. The container, for convenience, is referred to herein as a solids blender. A commercially available solids blender useful herein is referred to in the solids mixing art as a muller.

The ingredients added to the solids blender include dry, insoluble, solid particles, a binder and chemical agents selected from water soluble materials, water dispersible materials and mixtures thereof. The mentioned chemical agents can be liquids or can be dry, particulate or powdered solids and can include gelling agents, scale inhibitors, crosslinking agents, breakers, free flow agents and dust suppressants. All of the ingredients can be added simultaneously or in any order. In one embodiment, the various ingredients can be placed in the solids blender in the sequence of insoluble solid particles followed by binder and then followed by any one or a combination of gelling agent, scale inhibitor, cross linking agent, breaker, free flow agent and dust suppressant.

In operation, the paddles and blades associated with the solids blender are actuated, and then the various ingredients can be added to the operating blender. All of the ingredients to be included in the coating placed on the insoluble solid particles are added to the operating blender while the binder (the adhesive) is wet and sticky so that the additives will adhere to the solid particles. Blending is continued until the composition in the blender, upon visual inspection, appears to be dry and uniform in consistency and color. No external heating is employed in the manufacturing process to promote drying, but heat may be internally generated by interaction of the ingredients added to the blender.

Method of Making the Composition

One method of making the composition comprises the sequential addition of the various different ingredients to the solids blender. The first step of the sequential method is to place a weighed quantity of dry, insoluble, solid particles in a solids blender. The particles can be selected from various materials known to be useful as propping agents including silica dioxide, resin coated silica sand, sintered bauxite, resin coated cellulose and resin coated walnut hulls. An example of a resin coated cellulose is available from Fritz Industries, Inc., of Mesquite, Tex., under the trademark LiteProp 125. An example of a sintered bauxite is available from Mineracao Curimbaba, Ltda, of Minas Gerais, Brazil under the trademark SinterBall. The size of the solid particles placed in the blender is in the range of from about +8 to about −140 United States Sieve Series. The specific gravity of the insoluble solid particles is an amount in the range of from about 1.2 to about 3.8 compared to water which has a specific gravity of one and a density of about 62.3 pounds per cubic foot.

Thereafter, a weighed quantity of binder is added to the solids blender containing the solid particles. The binder can be a solute in an aqueous solution, a liquid phase material or a solid dispersed in water. The quantity of binder added to the blender is based on the quantity of solid particles in the blender. Accordingly, the quantity of binder is an amount in the range of from about 0.07 to about 5.0, and preferably from about 0.2 to about 1.0, pounds of binder per 100 pounds of solid particles.

The blender is actuated to initiate mixing after all of the solid particles and binder are placed in the blender. The goal of the mixing of the particles and binder is to produce a product in which the binder sticks to the surfaces of the insoluble solid particles. The product, by visual inspection, appears to be damp and to contain no visible clumps or agglomerates. The damp product of this mixing step is referred to herein as the first interim product.

The binder can be selected from various materials including liquid epoxy resins and liquid phenolic resins, required resin curing agents, corn syrup and aqueous polyvinylpyrrolidone. GAF Chemicals Corporation, of Wayne, N.J., markets polyvinylpyrrolodone under the trademark PVP K-30. Corn syrup is available under the trademark KARO.

The term epoxy resin means any of several types of synthetic thermosetting resins obtained by the condensation of an epoxide and an aromatic or an aliphatic polyol to form a product which is subsequently combined with an amine curing agent. The term phenolic resin means any of several types of synthetic thermosetting resins obtained by condensation of phenol or a substituted phenol with an aldehyde, such as formaldehyde, acetaldehyde and furfural. Additional quantities of an aldehyde can be employed as a curing agent.

While mixing continues at least one chemical agent selected from water soluble materials, water dispersible materials and mixtures thereof is added to the first interim product. In one aspect, the added chemical agent is a material which is useful in the treatment of a subsurface formation, such as a hydrocarbon bearing formation. Hydraulic fracturing is known to be a treatment of a hydrocarbon bearing subsurface formation.

Chemical agents known to be useful in hydraulic fracturing services include gelling agents, scale inhibitors, cross linking agents, and viscosity reducing agents (gel breakers). After addition of the chemical agent or agents to the first interim product followed by blending, the produced product is referred to herein as the second interim product.

A weighed quantity of a gelling agent can be added to the first interim product. The gelling agent during mixing sticks to the damp first interim product. The quantity of gelling agent added to the blender is based on the quantity of solid particles included in the first interim product. Accordingly, the quantity of gelling agent is an amount in the range of from about 0.2 to about 6.0, and preferably from about 0.8 to about 5.0, pounds of gelling agent per 100 pounds of insoluble solid particles in the first interim product.

Gelling agents useful herein include natural and synthetic polymers, such as polysacharides (glucomannan and galactomanan gums), guar gum derivatives, cellulose derivatives and polyacrylamides. Some specific gelling agents include guar gum, karaya gum, xanthan gum, gum arabic, carrageenan gum, welan gum, hydroxypropylguar, hydoxyethylcelluose, carboxymethylhydroxypropylguar and carboxymethylhydroxyethylcelluose.

At this point in the manufacturing process the composition can be removed from the blender, sized, as described below, and the sized second interim product can then be stored for future use in a hydraulic fracturing service.

Prior to removal of the second interim product from the blender, as mentioned above, and while mixing continues, additional optional ingredients can be added to the composition. Such ingredients can include an agent (a cross linker) to cross link the gel produced upon hydration of the gelling agent, a breaker to reduce the viscosity of the gel or cross-linked gel, a dust suppressant and a free flow agent. The optional ingredients can be added to the moving mass in any order.

The quantity of cross-linker which can be added is an amount in the range of from about 0.04 to about 0.2 pounds of cross linker per 100 pounds of solid particles. Examples of cross linkers include triethanolamine and boric acid.

The quantity of free flow agent which can be added is an amount in the range of from about 0.005 to about 0.02 pounds of free flow agent per 100 pounds of solid particles. A free flow agent useful herein is commercially available from IMS Company of Chagrin Falls, Ohio, under the trade name ACRAWAX C which is a combination of N,N'-ethylenebisstearamide and stearic acid.

Examples of dust suppressants useful herein can be corn oil, a composition consisting of 50 to 90 volume percent corn oil and 10 to 50 volume percent of a nonionic surfactant, and ethoxylated castor oil, commercially available from Harcros Chemicals Inc. of Kansas City, Kans. under the product name T-Det C 40. The quantity of dust suppressant is an amount in the range of from about 0.005 to about 0.02 pounds of dust suppressant per 100 pounds of the solid particles.

Mixing is terminated. The coated product of the method can then be sized and stored for future use. Sizing can be accomplished in a device known in the art as a "shaker" which is comprised of an array of vertically spaced screens. The array is mechanically vibrated or shaken to promote the downward movement of solids through openings in the screens positioned in the array, wherein the openings in each screen are different from the openings in every other screen in the array. The screens are arranged in the array from top to bottom so that the screen having the largest openings is positioned at the top of the array and the screen having the smallest openings is positioned at the bottom of the array. Any other screens in the array are positioned therein in the order of screen openings. Material which does not pass through the openings in a screen are called the oversize or plus (+) of the screen, and material which does pass through the openings in a screen are called the undersize or minus (−) of the screen. Screens are classified by numbers, wherein the larger the number the smaller the screen opening. For example, in the United States Sieve Series, the openings in screen 20 are larger than the openings in screen 40.

The solid particles initially placed in the blender have a size in the range of from about +8 (2.362 mm) to about −140 (0.104 mm) United States Sieve Series. The dry, flowable, second interim product is transferred to the shaker from the blender and is shaken as described. The output from the shaker has a size in the range of from about +8 to about −140 United States Sieve Series. The composition is placed in storage for appropriate transport to some remote location, such as a well location.

The composition, when employed in a hydraulic fracturing service, is mixed with an aqueous solution to form a fracturing fluid. The amount of aqueous solution must be sufficient to hydrate the gelling agent which is coated on the composition. The fracturing service operator, to determine the amount of water to mix with the composition of this invention, may require information concerning the identity of the gelling agent, the quantity of gelling agent coated on the solid particles and the nature of the solid particles.

As previously mentioned, the composition of this invention discloses a Particle Coating. Concentration in an amount in the range of from about 0.2 to about 6.0, and preferably from about 0.8 to about 5.0 pounds of gelling agent per 100 pounds of solid particles. The stated range is not limited to any particular gelling agent. Also as previously mentioned, insoluble solid particles believed to be useful herein have a specific gravity in the range of from about 1.2 to about 3.8 compared to water which has a specific gravity of one and a density of about 62.3 pounds per cubic foot.

The Particle Coating Concentration, when restated in terms of pounds of gelling agent per 100 pounds of composition, i.e., coated solid particles, can be employed in equations (which are derived in Example 6) to estimate water requirements. Accordingly, the Particle Coating Concentration, as restated, is an amount in the range of from about 0.1996 to about 5.6604, and preferably from about 0.7937 to about 4.7619 pounds of gelling agent per 100 pounds of composition. When the Particle Coating Concentration is about 5.6604 it is apparent that 100 pounds of composition can contain about 94.3396 pounds of solid particles. The general equation is therefore, B=100−X. (100 pounds of composition containing X pounds of gelling agent contains B pounds of solid particles.)

Formation fracturing methods specify the concentration of gelling agent to be employed to formulate an aqueous fracturing fluid having a desirable viscosity. One such specification of Gelling Agent Concentration, specifically for guar gum, in a useful fracturing fluid is an amount in the range of from about 14 to about 35, preferably 16 to 30, and more preferably from about to about 25 pounds of guar gum per 1000 gallons of water. It is believed that the concentration limits of other useful gelling agents fall approximately within the above ranges.

The amount of water required to be added to the composition of this invention (the coated solid particles) to produce a useful fracturing fluid can be estimated by dividing the Gelling Agent Concentration, designate herein as Z, by the restated Particle Coating Concentration, designated herein as X. The term, Water Concentration, designated herein as Y, is the result of the calculation. The letters Y and X are coordinates of the ordinate and abscissa, respectively, of a plotted curve of the Gelling Agent Concentration, Z. In practice, the manufacturer of the composition of this invention knows the value of X, and, by use of the calculation, can advise a user of the value of Y required to produce a desired Z. Equation 1 illustrates the calculation.

$$Y \text{ lb comp/gal water} = (100 \text{ lb comp}/X \text{ lb guar})*(Z \text{ lb guar/per } 1000 \text{ gal water})$$

Equation 1 can be stated as follows:

$$Y = Z/10X \tag{Eq. 1a}$$

$$Z = 10XY \tag{Eq. 1b}$$

$$X = Z/10Y \tag{Eq. 1c}$$

$$10 = Z/XY \tag{Eq. 1d}$$

If each of the variables X, Y and Z have values greater than zero, then it is seen that the ratio of Z to the product of X and Y (Eq. 1d) is a dimensionless constant. In this case, because of the definitions of Particle Coating Concentration, X, Water Concentration, Y, and Gelling Agent Concentration, Z, then, as shown in Equation 1, the constant has a value of 10. The value of the constant can vary given different definitions of the two variables, X and Y.

Equation 1 is based on the assumption that all of the gelling agent in the coating will operate to produce the desired Gelling Agent Concentration. Inspection of Equation 1a reveals that the value of Y varies indirectly with the ratio of the value of Z to the value of X. Thus, Y, at constant Z, increases as X decreases.

Equation 1 can be employed to determine the value of X, Y or Z by holding two of the variables constant and then calculating the value of the third. This technique is useful when determining the nature of the solid particle to be employed in a particular service. In this regard, it is known that the nature of the solid particle to be employed in an actual field service is based on the ratio of pounds of solid particle (for example a propping agent) to one gallon of water. This ratio is not the calculated value of Y which is the ratio of pounds of composition to one gallon of water. A calculation can be employed to relate pounds, P, of solid particles to X, Y and Z and particularly to X and Z. The phrase Proppant Transport Ratio is designated herein as P pounds of solid particles per gallon of water.

The relationship between the variables X, Y and Z can be visualized by inspection of a plot of information calculated using Equation 1. It can be seen from such a plot that the curves all have a negative slope and each curve approaches the axes of the plot.

Specific types of solid particles are preferably employed with specific quantities of water. Examples of the solid particles and the Proppant Transport Ratio, P, of each are as follows:

Bauxite & Ceramics can be transported in amounts in the range of from about 8 to about and preferably from about 12 to about 16 pounds Bauxite/Ceramic per gallon of water. The specific gravity of Bauxite is in the range of from about 3.58 to about 3.68. Other solid particles having the density of Bauxite & Ceramics are believed to be useful herein and fall within the Proppant Transport Ratio of Bauxite & Ceramics.

Sand can be transported in amounts in the range of from about 1 to about 8 pounds Sand per gallon of water. The specific gravity of silica sand is about 2.67. Other solid particles having the density of sand are believed to be useful herein and fall within the Proppant Transport Ratio of sand.

Cellulose with resin coating can be transported in amounts in the range of from about 0.05 to about 2.0, preferably from about 0.25 to about 1.5 and more preferably from about 0.75 to about 1.25 pounds resin coated cellulose per gallon of water. The specific gravity of cellulose having a resin coating is about 1.29. Other solid particles having the density of cellulose with resin coating are believed to be useful herein and fall within the Proppant Transport Ratio of cellulose with resin coating.

EXAMPLES

Example 1

Coated solid particles were prepared by mixing insoluble solid particles, a binder, water and a gelling agent. The mixing was performed in a mechanical apparatus adapted to stir, combine and move a mass of solid particles. The coated solid particles, after preparation, were mixed with an aqueous solution which caused the gelling agent on the coated solid particles to hydrate to thereby form a gel having a viscosity greater than the viscosity of the original solution. A cross linking agent was mixed with the gel to form a cross linked gel having a viscosity greater than the viscosity of the gel.

The entire quantity of solid particles was first added to the mixing apparatus. The mixer was actuated and then all of a water soluble, powdered binder was added to the operating mixer. Mixing was continued until, by visual inspection, a uniform mixture of binder and solid particles was produced. Thereafter, water was added to the moving mixture of solid particles and binder. Mixing continued until the mixture appeared to be uniformly wetted, but not dry. Finally, the entire quantity of a powdered gelling agent was added to the wetted mass. Mixing continued until, by visual inspection, the mixture of solid particles, binder and gelling agent appeared to be dry and contained no lumps or agglomerates. Mixing was then terminated. The thus produced coated solid particles were recovered and stored for further use. The identities and quantities of solid particles, binder, water and gelling agent placed in the mixer are provided below in Sample 1 of Table 1.

The entire quantity of coated solid particles made as described in Example 1 was placed in a suitable mixing container containing 250 grams of an aqueous solution containing 2% by weight KCl. The coated solid particles and KCl solution were mixed for about five minutes to enable hydration of the gelling agent to thereby form a gel having a viscosity greater than the viscosity of the KCl solution. Thereafter, about 0.9 grams of cross linking agent was added to the gel to form a cross linked gel having a viscosity greater than the viscosity of the gel.

The solid particles employed were sintered bauxite available from Mineracao Curimbaba Ltda under the trademark SinterBall. The particle size of the bauxite was in the range of from −30 to +50 United States Sieve Series. The binder employed was powdered polyvinylpyrrolidone available from GAF Chemicals Corporation under the trademark PVP-K-30. The gelling agent employed was powdered guar gum available from Shree Ram Gum and Chemicals under the trademark RamcoL. The cross linking agent employed was an aqueous solution of triethanolamine available from Schlumberger Technology Corporation under the trademark Crosslinker XE137.

Examination of Sample 1, Table 1 reveals that: the binder was present in the coated solid particles in an amount of about 0.0792 lbs binder/100 lbs solid particles; the gelling agent was present in the coated solid particles in an amount of about 0.833 lbs gelling agent/100 lbs solid particles; and the process water was present in the coated solid particles in an amount of about 0.36 lbs water per 100 lbs solid particles.

The quantity of KCL solution employed to produce the gel was about 20.572 lbs KCL solution per 100 lbs coated solid particles, and the quantity of cross linking agent employed to cross link the gel was about 0.0741 lbs cross linking agent per 100 lbs coated solid particles.

Example 2

Coated solid particles were prepared by mixing insoluble solid particles, a binder, water and a gelling agent. The mixing was performed in a mechanical apparatus adapted to stir, combine and move a mass of solid particles.

The entire quantity of solid particles were first added to the mixing apparatus. The mixer was actuated and then all of a water soluble, powdered binder was added to the operating mixer. Mixing was continued until, by visual inspection, a uniform mixture of binder and solid particles was produced. Thereafter, water was added to the moving mixture of solid particles and binder. Mixing continued until the mixture appeared to be uniformly wetted, but not dry. Finally, the entire quantity of a powdered gelling agent was added to the wetted mass. Mixing continued until, by visual inspection, the mixture of solid particles, binder and gelling agent appeared to be dry and contained no lumps or agglomerates. Mixing was then terminated. The identities and quantities of solid particles, binder, water and gelling agent placed in the mixer are provided below in Sample 2 of Table 1.

The solid particles employed were sand. The particle size of the sand was in the range of from −20 to +40 United States Sieve Series. The binder employed was powdered polyvinylpyrrolidone available from GAF Chemicals Corporation under the trademark PVP-K-30. The gelling agent employed was powdered guar gum available from Shree Ram Gum and Chemicals under the trademark RamcoL.

Examination of Sample 2, Table 1 reveals that: the binder was present in the coated solid particles in an amount of about 0.0794 lbs binder/100 lbs solid particles; the gelling agent was present in the coated solid particles in an amount of about 0.838 lbs gelling agent/100 lbs solid particles; and the process water was present in the coated solid particles in an amount of about 0.362 lbs water per 100 lbs solid particles.

Example 3

Coated solid particles were prepared by mixing insoluble solid particles, a binder, water, a gelling agent, a cross linking agent and a dust suppressant. The mixing was performed in a mechanical apparatus adapted to stir, combine and move a mass of solid particles.

The entire quantity of solid particles together with a liquid dust suppressant were first added to the mixing apparatus. The mixer was actuated and then all of a water soluble, powdered binder was added to the operating mixer. Mixing was continued until, by visual inspection, a uniform mixture of binder and solid particles was produced. Thereafter, water was added to the moving mixture of solid particles and binder. Mixing continued until the mixture appeared to be uniformly wetted, but not dry. The entire quantity of a powdered gelling agent was added to the wetted mass. Finally, the entire quantity of a cross linker was added to the wetted mass. Mixing continued until, by visual inspection, the mixture of solid particles, binder, gelling agent and cross linker appeared to be dry and contained no lumps or agglomerates. Mixing was then terminated. The identities and quantities of solid particles, binder, water, gelling agent and cross linker placed in the mixer are provided below in Sample 3 of Table 1.

The solid particles employed were sintered bauxite available from Mineracao Curimbaba Ltda under the trademark SinterBall. The particle size of the bauxite was in the range of −30 to +50 United States Sieve Series. The binder employed was powdered polyvinylpyrrolidone available from GAF Chemicals Corporation under the trademark PVP-K-30. The gelling agent employed was powdered guar gum available from Shree Ram Gum and Chemicals under the trademark RamcoL. The cross linking agent employed was boric acid. The dust suppressant was corn oil.

The solid particles employed were resin coated cellulose available from Fritz Industries, Inc. under the trademark LiteProp 125. The particle size of the resin coated cellulose was in the range of −14 to +30 United States Sieve Series. The binder employed was corn syrup. The gelling agent employed was powdered guar gum available from Shree Ram Gum and Chemicals under the trademark RamcoL. The cross linking agent employed was boric acid.

Examination of Sample 4, Table 1 reveals that: the binder was present in the coated solid particles in an amount of about 2.632 lbs binder/100 lbs solid particles; the gelling agent was present in the coated solid particles in an amount of about 4.263 lbs gelling agent/100 lbs solid particles; and the cross linker was present in the coated solid particles in an amount of about 0.137 lbs cross linker per 100 lbs solid particles.

TABLE 1

COATED SOLID PARTICLES

| Sample | Solid Particle | | Binder | | Gelling Agent | | Cross Linker | | Water |
|---|---|---|---|---|---|---|---|---|---|
| | Type | Grams | Type | Grams | Type | Grams | Type | Grams | Grams |
| 1 | Sintered Bauxite | 1200.00 | PVP (f.n. 2) | 0.95 | Guar | 10.00 | — | — | 4.315 |
| 2 | Sand | 4535.90 | PVP | 3.60 | Guar | 38.00 | — | — | 16.400 |
| 3 (f.n. 1) | Sintered Bauxite | 7264.00 | PVP | 40.00 | Guar | 182.00 | Boric Acid | 5.70 | 45.000 |
| 4 | Resin Coated Cellulose | 1900.00 | Corn Syrup | 50.00 | Guar | 81.00 | Boric Acid | 2.60 | — |

Footnote 1. The coated solid particles in sample 3 also contained 4 cc of corn oil.
Footnote 2. PVP is polyvinylpyrrolidone Examination of Sample 3, Table 1 reveals that: the binder was present in the coated solid particles in an amount of about 0.551 lbs binder/100 lbs solid particles; the gelling agent was present in the coated solid particles in an amount of about 2.506 lbs gelling agent/100 lbs solid particles; the process water was present in the coated solid particles in an amount of about 0.619 lbs water per 100 lbs solid particles and the cross linker was present in the coated solid particles in an amount of about 0.078 lbs cross linker per 100 lbs solid particles.

A total of 4 cc of corn oil was added to the mixer. This quantity converts to 0.845 fluid ounces corn oil per 100 lbs solid particles.

Example 4

Coated solid particles were prepared by mixing insoluble solid particles, a binder, a gelling agent and a cross linking agent. The mixing was performed in a mechanical apparatus adapted to stir, combine and move a mass of solid particles.

The entire quantity of solid particles were first added to the mixing apparatus. The mixer was actuated and then all of a liquid binder was added to the operating mixer. Mixing was continued until, by visual inspection, a uniform mixture of binder and solid particles which appeared to be uniformly wetted, but not dry, was produced. Thereafter, the entire quantity of a powdered gelling agent was added to the wetted mass. Finally, the entire quantity of a cross linker was added to the wetted mass. Mixing continued until, by visual inspection, the mixture of solid particles, binder, gelling agent and cross linking agent appeared to be dry and contained no lumps or agglomerates. Mixing was then terminated. The identities and quantities of solid particles, binder, gelling agent and cross linker placed in the mixer are provided below in Sample 4 of Table 1.

Example 5

Coated solid particles were prepared by mixing insoluble solid particles, a binder and a scale inhibitor. The mixing was performed in a mechanical apparatus adapted to stir, combine and move a mass of solid particles. The prepared coated solid particles were tested to determine the release of polyphosphate scale inhibitor.

Preparation of Coated Solid Particles

A resin mixture was prepared by combining and mixing 115.2 grams of liquid epoxy resin, 15 grams of diethylene glycol monobutyl ether and 113.5 grams of a solid particulate scale inhibitor. Twenty (20) grams of a hardener for the epoxy resin was added to the resin mixture. The resin mixture and hardener was stirred to form 263.7 grams of a homogenous combination of resin, ether, hardener and particulate scale inhibitor.

All of the above described prepared combination was added to an operating solids laboratory mixer containing 4536 grams of sand having a size in the range of −40 to +70 United States Sieve Series. Mixing was continued until, by visual inspection, there was formed a uniform, dry (non-wet) free flowing mixture of coated sand. The coated sand weighed 4799.7 grams which included about 23.647311 milligrams of scale inhibitor.

The liquid epoxy resin employed is available from Beijing Ranger Chemical Company under the trademark SM-828. The hardener employed was an aliphatic polyamine available from the Dow Chemical Company under the trademark D.E.H. 58. The scale inhibitor employed was a solid, slow dissolving, dimetallic polyphosphate available from Halliburton Energy Services under the trademark SCP-2.

Sample Test Procedure

Three weighed samples of the prepared coated sand were tested to determine the release of polyphosphate inhibitor from the coating. Each sample was placed in a glass mortar and ground to a powder. The powder was then placed in a pre-weighed 4 ounce jar and the mortar was rinsed with a quantity of dilute nitric acid (having a concentration of about 2% by weight) into the jar. The jar containing the powder and acid was then placed in a bath maintained at 160° F. for about 2 hours. After the 2 hour period, the jar was removed from the bath and permitted to cool to room temperature. A quantity of the solution in the 4 ounce jar was placed in a 2 ounce jar. The solution in the 2 ounce jar included acid and dissolved scale inhibitor. A quantity of deionized water was then added to the 2 ounce jar. The quantities of materials involved in the testing are reported in Table 2A.

TABLE 2A

TEST SAMPLE PREPARATION

| Sample | A<br>Sample<br>Weight<br>(Coated<br>Sand)<br>placed in<br>4-oz jar<br>mg | B<br>Scale<br>Inhibitor<br>in<br>Sample<br>mg | C<br>Nitric<br>Acid<br>(about<br>2%)<br>placed in<br>4-oz jar<br>mL | D<br>Test<br>Quantity<br>(coated sand,<br>inhibitor<br>and acid)<br>placed<br>in 2 oz jar<br>mL | E<br>Water<br>added to<br>2 oz jar<br>containing<br>Test<br>Quantity<br>mL |
|---|---|---|---|---|---|
| 1 | 1503 | 35.541909 | 103.886 | 1.028 | 49.437 |
| 2 | 1497 | 35.400025 | 100.931 | 1.003 | 50.597 |
| 3 | 1503 | 35.541909 | 100.840 | 1.001 | 50.051 |

Foot notes:
A = weighed quantity of prepared coated sand placed in 4 ounce jar
B = (A) * (23.647311)/1000
C = volume of acid placed in jar
D = volume of solution from 4 ounce jar placed in 2 ounce jar
E = volume of DI water placed in 2 ounce jar The solution in each 2 ounce jar (from Column E) was analyzed for phosphorus content. The result of each analysis is reported in Table 2B: as the weight of released phosphorus in mg per liter of solution; as the weight of released phosphorus as percent by weight of the test quantity (Column B, Table 2A); and as the weight of released phosphorus as percent by weight of the original Sample (Column A, Table 2A).

TABLE 2B

ANALYSIS OF TEST QUANTITY

| Sample | F<br>Scale<br>Inhibitor<br>in<br>Test<br>Quantity<br>mg | G<br>Phosphorus<br>released from<br>Test Quantity<br>mg per liter<br>solution | Phosphorus Released Percent By Weight | |
|---|---|---|---|---|
| | | | H<br>Test<br>Quantity | I<br>Original<br>Sample |
| 1 | 0.351704 | 0.604742 | 8.677270 | 0.205 |
| 2 | 0.351787 | 0.678958 | 9.958933 | 0.236 |
| 3 | 0.352811 | 0.638699 | 9.242019 | 0.219 |

Footnotes:
F = (B) * (D)/(C)
G = results from laboratory analysis of solution from Column E
H = [((G/1000) * (D + E))/(F)] * 100
I = [((G/1000) * (D + E)/(D) * (C))/(A)] * 100

The results of Example 5 show that a scale inhibitor can be coated on a particulate substrate and then subsequently slowly released in an aqueous environment.

Example 6

It is known that a gelling agent, when dispersed or dissolved in water, affects the viscosity of the water. It is also known that the viscosity increases as the quantity of gelling agent per unit quantity of water increases. It has been learned by observation and experience that aqueous fracturing fluids having useful viscosities can be produced by employing quantities of gelling agent within a specified range of ratios of gelling agent to water. The ratios have been expressed as a quantity of gelling agent per 1000 gallons of water. For purposes of this Example 6 and the disclosure of this invention, the ratio of gelling agent to water is referred to as the Gelling Agent Concentration, and is mathematically expressed as Z pounds gelling agent per 1000 gallons water.

The composition of this invention, when employed to produce a fracturing fluid, includes a mass of insoluble solid particles whose exterior surfaces are coated with a gelling agent. For purposes of this Example 6 and the disclosure of this invention, the weight ratio of gelling agent to composition is referred to as the Particle Coating Concentration, and is mathematically expressed as X pounds gelling agent per 100 pounds composition. The Particle Coating Concentration can also be mathematically expressed as A pounds gelling agent per 100 pounds insoluble solid particles.

An entity using the composition to make a fracturing fluid must mix a specific quantity of water with the composition to produce a desired Gelling Agent Concentration. For purposes of this Example 6 and the disclosure of this invention, the ratio of composition to water to produce the desired Gelling Agent Concentration is referred to as the Water Concentration, and is mathematically expressed as Y pounds composition per gallon of water. The using entity may prefer the expression of Water Concentration to be in terms of gallons of water per pound of composition. The inverse of "Y", i.e., 1/Y, provides such an expression.

An entity, such as a fracturing service operator, which actually transports solid particles in water to a subsurface formation may desire a specific solid particle or one which otherwise possesses a certain density. The desire can be expressed in terms of the weight ratio of specific type particle per unit quantity of water. For purposes of this Example 6 and the disclosure of this invention, the weight ratio of solid particles to water is referred to as the Proppant Transport Ratio, and is mathematically expressed as P pounds solid particle per gallon water. An operator having first calculated Water Concentration, Y, may then calculate Proppant Transport Ratio, P, to help determine the specific nature or type of coated solid particle to be transported.

Derivation of Formulas

Assume:
1. Z=pounds gelling agent per 1000 gallons water
2. X=pounds of gelling agent per 100 pounds of composition
3. A=pounds gelling agent per 100 pounds solid particles
4. B=pounds solid particles per 100 pounds composition Wanted:
1. Y=pounds of composition per gallon of water
2. P=pounds solid particles per gallon water Solution:
1. 100 pounds composition=B pounds solid particles+X pounds gelling agent Therefore:

$$B = 100 - X \qquad \text{Eq. 4}$$

2. Y lb comp/gal water=(100 lb comp/X lb ga)*(Z lb ga/1000 gal water)

(Note: "ga" is an abbreviation for gelling agent)
(Note: "comp" is an abbreviation for composition)

$$Y = Z/10X \quad \text{Eq. 1a}$$

$$Z = 10XY \quad \text{Eq. 1b}$$

$$X = Z/10Y \quad \text{Eq. 1c}$$

$$10 = Z/XY \quad \text{Eq. 1d}$$

3. P lb prop/gal water=(B lb prop/100 lb comp)*(100 lb comp/X lb ga)*(Z lb ga/1000 gal water)
(Note: "prop" is an abbreviation for solid particles)

$$P = (B \text{ lb prop}/100 \text{ lb comp})*(100 \text{ lb comp}/X \text{ lb ga})*(Z \text{ lb ga}/1000 \text{ gal water})$$

$$P = (BZ)/1000X$$

substitution $$P = (100 \times X)*Z/1000X \quad \text{Eq. 2a}$$

4. If P is known then solve Eq. 2a for X:

$$(100-X)/(1000X) = P/Z$$

$$(100-X)/X = 1000P/Z$$

$$(100-X) = 1000PX/Z$$

$$100 = (1000PX)/Z + X$$

$$100 = (1000PX + ZX)/Z$$

$$100 = X*(1000P + Z)/Z$$

$$X*(1000P + Z) = 100Z$$

$$X = 100Z/(1000P + Z) \quad \text{Eq. 2b}$$

5. If X is known then calculate A:

$$A \text{ lb ga}/100 \text{ lb prop} = (X \text{ lb ga}/100 \text{ lb comp})*(100 \text{ lb comp}/B \text{ lb prop})*100$$

$$A = (X/B)*100$$

substitution $$A = (X)*100/(100-X) \quad \text{Eq. 3a}$$

6. If A is known calculate X by solving Eq. 3a for A $$100X = A(100-X)$$

$$100X = 100A - AX$$

$$100X + AX = 100A$$

$$X(100+A) = 100A$$

$$X = (100A)/(100+A) \quad \text{Eq. 3b}$$

Use of Formulas

Formulas 1-4 can be employed to calculate data points which correspond to specific values of Gelling Agent Concentration, Z, Particle Coating Concentration, X, Water Concentration, Y, and Proppant Transport Ratio, P. Formulas 1-4 were employed to calculate the information given in Table 3, which is attached.

Table 3, connects specific values of X, Y and P at constant values of Z. Table 3, is based on Z values of 14 and 35. In general, a target value of Z was established and values of Y and P were calculated for specified values of X, wherein the value of X (with certain exceptions) was increased at a uniform rate. Accordingly, Equation 1a was used to calculate values of Y based on assumed values of X and Z; Equations 2a and 4 were used to calculate values of P based on the same assumed values of X and Z.

Values of X and Y were calculated for specified values of P (1, 2, 8, 12 and 16), wherein Equation 2b was used to calculate X, and Equation 1a was used to calculate Y.

Equation 3b was employed to calculate values of X (0.1996, 0.7937, 4.7619 and 5.6604) based on specified values of A (0.2, 0.8, 5.0 and 6.0, respectively). Thereafter, Equation 1a was used to calculate Y, and Equations 2a and 4 were used to calculate P.

TABLE 3

| | Z = 35 (f.n. 3) | | | Z = 14 (f.n. 3) | | |
|---|---|---|---|---|---|---|
| X (f.n. 1) | Y (f.n. 2) | P (f.n. 4) | Particulate (f.n. 7) | Y (f.n. 2) | P (f.n. 4) | Particulate (f.n. 7) |
| 0.1996 (f.n. 6) | 17.5351 | 17.5001 | Bau & Cer | 7.0140 | 7.0000 | Sand |
| 0.2000 | 17.5000 | 17.4650 | Bau & Cer | 7.0000 | 6.9860 | Sand |
| 0.2183 | 16.0350 | 16 (f.n. 5) | Bau & Cer | 6.4140 | 6.4000 | Sand |
| 0.2908 | 12.0350 | 12 (f.n. 5) | Bau & Cer | 4.8140 | 4.8000 | Sand |
| 0.3000 | 11.6667 | 11.6317 | Bau & Cer | 4.6667 | 4.6527 | Sand |
| 0.4000 | 8.7500 | 8.7150 | Bau & Cer | 3.5000 | 3.4860 | Sand |
| 0.4356 | 8.0350 | 8 (f.n. 5) | B, Cer & S | 3.2140 | 3.2000 | Sand |
| 0.5000 | 7.0000 | 6.9650 | Sand | 2.8000 | 2.7860 | Sand |
| 0.6000 | 5.8333 | 5.7983 | Sand | 2.3333 | 2.3193 | Sand |
| 0.6951 | 5.0350 | 5.0000 | Sand | 2.0140 | 2 (f.n. 5) | S & C |
| 0.7000 | 5.0000 | 4.9650 | Sand | 2.0000 | 1.9860 | S & C |
| 0.7937 (f.n. 6) | 4.4097 | 4.3747 | Sand | 1.7639 | 1.7499 | S & C |
| 0.8000 | 4.3750 | 4.3400 | Sand | 1.7500 | 1.7360 | S & C |
| 0.9000 | 3.8889 | 3.8539 | Sand | 1.5556 | 1.5416 | S & C |
| 1.0000 | 3.5000 | 3.4650 | Sand | 1.4000 | 1.3860 | S & C |
| 1.1000 | 3.1818 | 3.1468 | Sand | 1.2727 | 1.2587 | S & C |
| 1.2000 | 2.9167 | 2.8817 | Sand | 1.1667 | 1.1527 | S & C |
| 1.3000 | 2.6923 | 2.6573 | Sand | 1.0769 | 1.0629 | S & C |
| 1.3807 | 2.5350 | 2.5000 | Sand | 1.0140 | 1 (f.n. 5) | S & C |
| 1.4000 | 2.5000 | 2.4650 | Sand | 1.0000 | 0.9860 | Cellulose |
| 1.5000 | 2.3333 | 2.2983 | Sand | 0.9333 | 0.9193 | Cellulose |
| 1.6000 | 2.1875 | 2.1525 | Sand | 0.8750 | 0.8610 | Cellulose |
| 1.7000 | 2.0588 | 2.0238 | Sand | 0.8235 | 0.8095 | Cellulose |
| 1.7199 | 2.0350 | 2 (f.n. 5) | S & C | 0.8140 | 0.8000 | Cellulose |
| 1.8000 | 1.9444 | 1.9094 | S & C | 0.7778 | 0.7638 | Cellulose |
| 1.9000 | 1.8421 | 1.8071 | S & C | 0.7368 | 0.7228 | Cellulose |
| 2.0000 | 1.7500 | 1.7150 | S & C | 0.7000 | 0.6860 | Cellulose |
| 2.1000 | 1.6667 | 1.6317 | S & C | 0.6667 | 0.6527 | Cellulose |
| 2.2000 | 1.5909 | 1.5559 | S & C | 0.6364 | 0.6224 | Cellulose |
| 2.3000 | 1.5217 | 1.4867 | S & C | 0.6087 | 0.5947 | Cellulose |
| 2.4000 | 1.4583 | 1.4233 | S & C | 0.5833 | 0.5693 | Cellulose |
| 2.5000 | 1.4000 | 1.3650 | S & C | 0.5600 | 0.5460 | Cellulose |
| 2.6000 | 1.3462 | 1.3112 | S & C | 0.5385 | 0.5245 | Cellulose |
| 2.7000 | 1.2963 | 1.2613 | S & C | 0.5185 | 0.5045 | Cellulose |
| 2.8000 | 1.2500 | 1.2150 | S & C | 0.5000 | 0.4860 | Cellulose |
| 2.9000 | 1.2069 | 1.1719 | S & C | 0.4828 | 0.4688 | Cellulose |
| 3.0000 | 1.1667 | 1.1317 | S & C | 0.4667 | 0.4527 | Cellulose |
| 3.1000 | 1.1290 | 1.0940 | S & C | 0.4516 | 0.4376 | Cellulose |
| 3.2000 | 1.0938 | 1.0588 | S & C | 0.4375 | 0.4235 | Cellulose |
| 3.3000 | 1.0606 | 1.0256 | S & C | 0.4242 | 0.4102 | Cellulose |
| 3.3816 | 1.0350 | 1 (f.n. 5) | S & C | 0.4140 | 0.4000 | Cellulose |
| 3.4000 | 1.0294 | 0.9944 | Cellulose | 0.4118 | 0.3978 | Cellulose |
| 3.5000 | 1.0000 | 0.9650 | Cellulose | 0.4000 | 0.3860 | Cellulose |
| 3.6000 | 0.9722 | 0.9372 | Cellulose | 0.3889 | 0.3749 | Cellulose |
| 3.7000 | 0.9459 | 0.9109 | Cellulose | 0.3784 | 0.3644 | Cellulose |
| 3.8000 | 0.9211 | 0.8861 | Cellulose | 0.3684 | 0.3544 | Cellulose |

TABLE 3-continued

| | Z = 35 (f.n. 3) | | | Z = 14 (f.n. 3) | | |
|---|---|---|---|---|---|---|
| X (f.n. 1) | Y (f.n. 2) | P (f.n. 4) | Particulate (f.n. 7) | Y (f.n. 2) | P (f.n. 4) | Particulate (f.n. 7) |
| 3.9000 | 0.8974 | 0.8624 | Cellulose | 0.3590 | 0.3450 | Cellulose |
| 4.0000 | 0.8750 | 0.8400 | Cellulose | 0.3500 | 0.3360 | Cellulose |
| 4.1000 | 0.8537 | 0.8187 | Cellulose | 0.3415 | 0.3275 | Cellulose |
| 4.2000 | 0.8333 | 0.7983 | Cellulose | 0.3333 | 0.3193 | Cellulose |
| 4.3000 | 0.8140 | 0.7790 | Cellulose | 0.3256 | 0.3116 | Cellulose |
| 4.4000 | 0.7955 | 0.7605 | Cellulose | 0.3182 | 0.3042 | Cellulose |
| 4.5000 | 0.7778 | 0.7428 | Cellulose | 0.3111 | 0.2971 | Cellulose |
| 4.6000 | 0.7609 | 0.7259 | Cellulose | 0.3043 | 0.2903 | Cellulose |
| 4.7000 | 0.7447 | 0.7097 | Cellulose | 0.2979 | 0.2839 | Cellulose |
| 4.7619 (f.n. 6) | 0.7350 | 0.7000 | Cellulose | 0.2940 | 0.2800 | Cellulose |
| 4.8000 | 0.7292 | 0.6942 | Cellulose | 0.2917 | 0.2777 | Cellulose |
| 4.9000 | 0.7143 | 0.6793 | Cellulose | 0.2857 | 0.2717 | Cellulose |
| 5.0000 | 0.7000 | 0.6650 | Cellulose | 0.2800 | 0.2660 | Cellulose |
| 5.1000 | 0.6863 | 0.6513 | Cellulose | 0.2745 | 0.2605 | Cellulose |
| 5.2000 | 0.6731 | 0.6381 | Cellulose | 0.2692 | 0.2552 | Cellulose |
| 5.3000 | 0.6604 | 0.6254 | Cellulose | 0.2642 | 0.2502 | Cellulose |
| 5.4000 | 0.6481 | 0.6131 | Cellulose | 0.2593 | 0.2453 | Cellulose |
| 5.5000 | 0.6364 | 0.6014 | Cellulose | 0.2545 | 0.2405 | Cellulose |
| 5.6000 | 0.6250 | 0.5900 | Cellulose | 0.2500 | 0.2360 | Cellulose |
| 5.6604 (f.n. 6) | 0.6183 | 0.5833 | Cellulose | 0.2473 | 0.2333 | Cellulose |
| 5.7000 | 0.6140 | 0.5790 | Cellulose | 0.2456 | 0.2316 | Cellulose |
| 5.8000 | 0.6034 | 0.5684 | Cellulose | 0.2414 | 0.2274 | Cellulose |
| 5.9000 | 0.5932 | 0.5582 | Cellulose | 0.2373 | 0.2233 | Cellulose |
| 6.0000 | 0.5833 | 0.5483 | Cellulose | 0.2333 | 0.2193 | Cellulose |

Footnotes:
1. X = pounds gelling agent per 100 pounds composition = Z/10/Y
2. Y = pounds composition per gallon water = Z/10/X
3. Z = pounds gelling agent per 1000 gallons water = (10) * (X) * (Y)
4. P = pounds insoluble solid particles per gallon water = (100 − X) * Z/1000X
5. X = pounds gelling agent per 100 pounds composition = 100 * Z/(1000 * P + Z)
6. X = pounds gelling agent per 100 pounds composition = (100 * A)/(100 + A)
A = pounds gelling agent per 100 pounds insoluble solid particles
7. Bau & Cer = Bauxite and Ceramics (and materials with equal densities)
B, Cer & S = Bauxite, Ceramics and Sand (and materials with equal densities)
Sand = Sand (and materials with equal densities)
S & C = Sand and Cellulose with Resin Coating (and materials with equal densities)
Cellulose = Cellulose with Resin Coating (and materials with equal densities)

Figure 1:
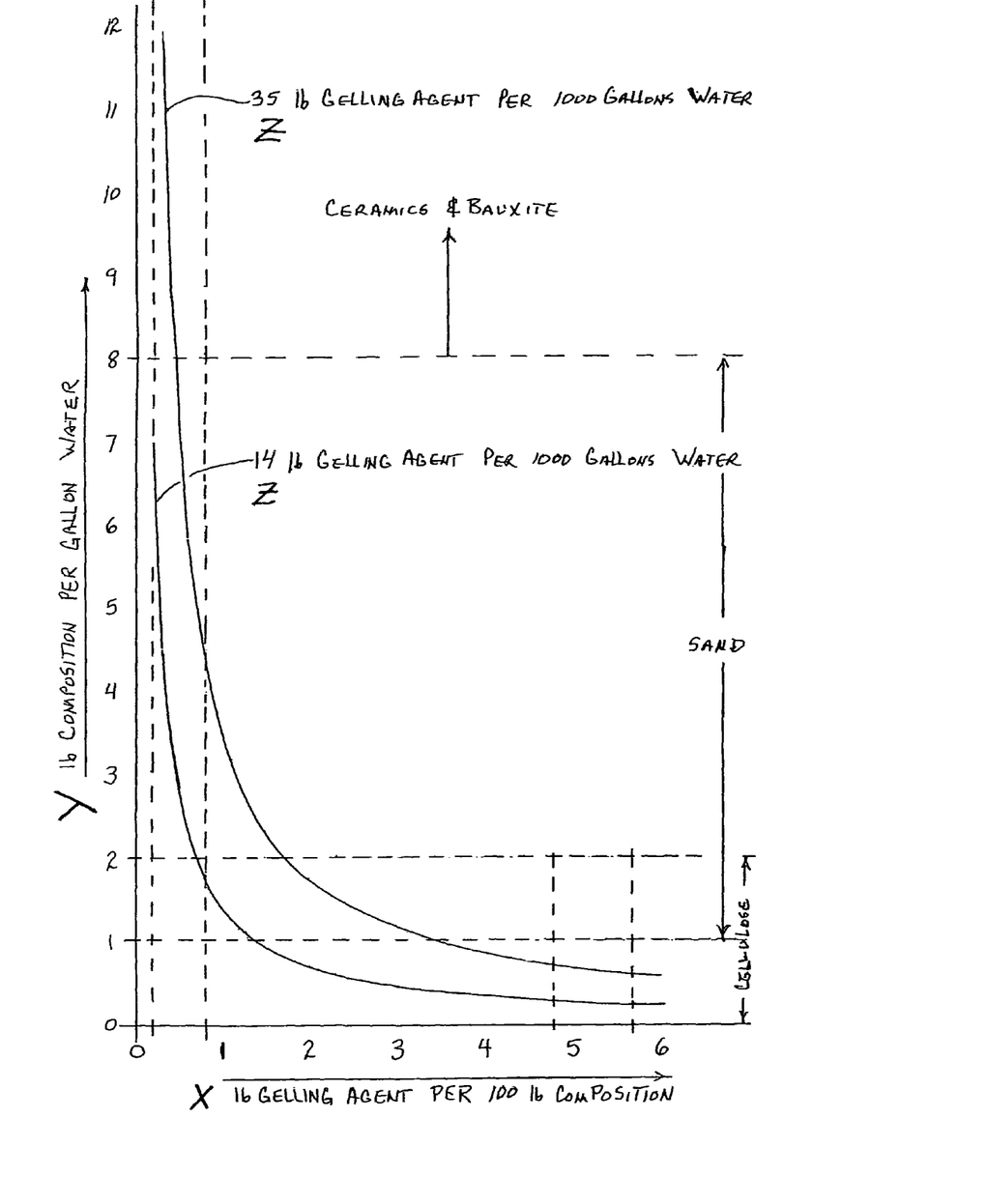

Data calculated in Table 3 were plotted in FIG. 1 which is attached. FIG. 1 contains plots of values of Y versus corresponding values of X to produce curves for Gelling Agent Concentrations, Z=35 and Z=14. The curves reveal that the value of Y vanes indirectly with the value of X. Thus, Y, at constant Z, decreases as X increases. Considering Equations 1a and 1c it is evident that one data point in each "Z" curve results from the condition where the numerical values of Y and X are equal. Thus, at Z=14, it can be calculated that X=Y=1.1832, and, at Z=35, it can be calculated that X=Y=1.8708. The value of Y rapidly increases as the value of X becomes smaller than the value of Y, while the value of Y and slowly decreases as the value of X becomes larger than Y.

FIG. 1 depicts dashed lines which are perpendicular to the X axis and parallel to the Y axis, and dashed lines which are parallel to the X axis and perpendicular to the Y axis. The lines perpendicular to the X axis are lines of constant Particle Coating Concentration, X, i.e., 0.1996, 0.7937, 4.7619 and 5.6604 pounds of gelling agent per 100 pounds composition. (Note Footnote 6 of Table 3.) The lines perpendicular to the Y axis are lines of constant Proppant Transport Ratio, P, i.e., 8, 2 and 1 pounds solid particle per gallon water. (Note Footnote 5 of Table 3.) Areas in FIG. 1 between the Gelling Agent Concentration, Z, curves, the Particle Coating Concentration, X, lines and Proppant Transport Ratio, P, lines indicate conditions where specified insoluble solid particles (or other particles of equal density) are useful in fracturing operations as propping agents in the composition of this invention.

Review of FIG. 1 shows that the quantity of water required to transport solid particles in a hydraulic fracturing service is indirectly proportional to the density of the solid particles. Accordingly, based on the values of Y calculated in Table 3, it is seen, in view of the inverse values of Y, that Bauxite and Ceramics require in the range of from about 0.0572 to about 0.125 gallons of water per pound of solids; that Sand requires in the range of from about 0.125 to about 1 gallon of water per pound of solids; and that Resin Coated Cellulose requires in the range of from about 0.5 to about 4.2863 gallons of water per pound of solids.

Having described the invention, that which is claimed is:

1. A method of making a viscous aqueous liquid in a first location for transport to and use in a second location, said viscous aqueous liquid having insoluble solid particles suspended therein, said method being comprised of the steps of:
   providing a container in said first location,
   introducing into said container a first quantity of a dry and flowable composition and a second quantity of an aqueous liquid,
   mixing said first quantity of said composition with said second quantity of said aqueous liquid in said container for a time sufficient to produce said viscous aqueous liquid having said insoluble solid particles suspended therein and
   transporting said viscous aqueous liquid having said insoluble solid particles suspended therein;
   wherein:
   said composition is comprised of a mass of discrete solids consisting of said insoluble solid particles having a dry coating on the exterior surfaces thereof, said dry coating being comprised of a binder selected from polyvinylpyrrolidone or corn syrup and a gelling agent selected from guar gum, karaya gum, xanthan gum, gum arabic, carrageenan gum, welan gum, hydroxypropyl guar, hydroxyethycellulose, carboxymethylhydroxypropylguar or carboxymethylhydroxyethylcellulose;
   said gelling agent in said composition, upon contact with said first quantity of said aqueous liquid during said mixing in said container, produces said viscous aqueous liquid;
   and
   said viscous aqueous liquid has a viscosity greater than the viscosity of said aqueous liquid.

2. The method of claim 1 wherein the relationship between said composition, said gelling agent and said aqueous liquid can be calculated by the formula $$Y = Z/10X$$

wherein
   Y is equal to the number of pounds of said first quantity of said composition per gallon of said second quantity of said aqueous liquid,
   Z is equal to the number of pounds of said gelling agent per 1000 gallons of aqueous liquid and
   X, is equal to the number of pounds of said gelling agent per 100 pounds of said composition.

3. The method of claim 2 wherein the value of Y, is an amount in the range of from about 0.23 to about 17.54 pounds of said first quantity of said composition per gallon of said second quantity of aqueous liquid.

4. The method of claim 2 wherein the value of Z is an amount in the range of from about 14 to about 35 pounds of said gelling agent per 1000 gallons of aqueous liquid.

5. The method of claim 2 wherein the value of X is an amount in the range of from about 0.19 to about 5.7 pounds of said gelling agent per 100 pounds of said composition.

6. The method of claim 2 wherein said viscous aqueous liquid is a fracturing fluid and said insoluble solid particles suspended therein are proppants.

7. The method of claim 6 wherein said binder is present in said composition in an amount in the range of from about 0.07 to about 5.0 pounds of said binder per 100 pounds of said insoluble solid particles.

8. The method of claim 1 wherein said gelling agent is present in said composition in an amount in the range of from about 0.2 to about 6.0 pounds of said gelling agent per 100 pounds of said insoluble solid particles.

9. The method of claim 8 wherein said insoluble solid particles have a size in the range of from about +8 to about −140 United States Sieve Series and said particles are dry and free-flowing.

10. The method of claim 9 wherein said viscous aqueous liquid is a fracturing fluid and said insoluble solid particles suspended therein are proppants.

11. The method of claim 1 wherein said insoluble solid particles are selected from silica dioxide, resin coated silica sand, sintered bauxite, resin coated cellulose or resin coated walnut hulls.

\* \* \* \* \*